(12) United States Patent
Shirilla

(10) Patent No.: US 6,491,405 B1
(45) Date of Patent: Dec. 10, 2002

(54) PHOTOGRAPHIC UMBRELLA WITH REFLECTIVE AND DIFFUSIVE LININGS

(75) Inventor: John E. Shirilla, 7726 Cliffview Dr., Poland, OH (US) 44514

(73) Assignee: John E. Shirilla, Poland, OH (US)

(*) Notice: Subject to any disclaimer, the term of this patent is extended or adjusted under 35 U.S.C. 154(b) by 0 days.

(21) Appl. No.: 09/713,941

(22) Filed: Nov. 16, 2000

Related U.S. Application Data

(60) Provisional application No. 60/166,144, filed on Nov. 18, 1999.

(51) Int. Cl.[7] ............................................... G03B 15/02
(52) U.S. Cl. .............................. 362/16; 362/3; 362/17; 362/18; 362/320
(58) Field of Search .............................. 362/16, 7, 18, 362/341, 296, 257, 317

(56) References Cited

U.S. PATENT DOCUMENTS

| | | | | |
|---|---|---|---|---|
| 3,294,962 A | * | 12/1966 | Hilzen | ........................ 362/13 |
| 3,851,164 A | | 11/1974 | Intrator | |
| 4,052,607 A | | 10/1977 | Larson | |
| 4,078,170 A | * | 3/1978 | Sloop | ........................ 359/847 |
| 4,210,952 A | * | 7/1980 | Ressmeyer | .................. 362/106 |
| 4,446,506 A | | 5/1984 | Larson | |
| 4,594,645 A | | 6/1986 | Terashita | |
| 4,633,374 A | | 12/1986 | Waltz et al. | |
| 4,757,425 A | | 7/1988 | Waltz | |
| 5,023,757 A | * | 6/1991 | Shirilla | ........................ 362/16 |

FOREIGN PATENT DOCUMENTS

JP          05-232553       9/1993

* cited by examiner

Primary Examiner—Thomas M. Sember
Assistant Examiner—David V. Hobden
(74) Attorney, Agent, or Firm—Emerson & Skeriotis; John M. Skeriotis; Roger D. Emerson

(57) ABSTRACT

A photographic umbrella includes a skeletal frame and both a reflective inner surface and a diffusive inner surface secured in relation to the frame. The frame defines an inner concavity or recess that opens at a mouth portion. A first cover member made from fabric or other suitable material is secured to the frame, and an inner surface of the first cover member conforms generally to the shape of the inner concavity. This inner surface of the first cover member includes a highly reflective surface. A second, translucent cover member is placed in covering relation with the reflective inner surface of the first cover member so that the second cover member at least substantially covers the reflective inner surface. Thus, the second cover member diffuses light incident thereon and the reflective inner surface reflects light that passes through the second cover member.

13 Claims, 2 Drawing Sheets

PHOTOGRAPHIC UMBRELLA WITH REFLECTIVE AND DIFFUSIVE LININGS

This application claims benefit of Ser. No. 60/166,144, filed Nov. 18, 1999

BACKGROUND OF THE INVENTION

Photographic umbrellas are widely known and employed. In general, these umbrellas are used to direct light from a source onto a subject to be photographed, filmed, or otherwise viewed in an indirect manner that provides a more realistic or "soft" light. This is in contrast to lighting a subject simply by placing a light source nearby. An example of such a prior photographic umbrella is disclosed in U.S. Pat. No. 5,023,757 to John Shirilla, and the Shirilla '757 patent is hereby expressly incorporated by reference herein. The photographic umbrella disclosed in the Shirilla '757 patent includes a covering over all of the internal ribs of the umbrella frame and, thus, has been found to be particularly effective in eliminating the appearance of the ribs or shadows of same (hereinafter referred to as "artifacts") in the "catch" lights of the subject.

While the photographic umbrella disclosed in the aforementioned U.S. Pat. No. 5,023,757 has enjoyed widespread commercial success and has been found to be highly effective, there has been found a need for an improved photographic umbrella that provides both reflected and diffused light from a given source incident thereon, while still eliminating artifacts in the catch lights.

SUMMARY OF THE INVENTION

In accordance with the present invention, a new and improved photographic umbrella is provided. The subject photographic umbrella includes a skeletal frame and both a reflective inner surface and a diffusive inner surface secured in relation to the frame. More particularly, the frame defines an inner concavity or recess that opens at a mouth portion. Light is directed from a source into the concavity through the mouth of the concavity or, alternatively, the light source is fully received in the concavity. A first cover member made from fabric or other suitable material is secured to the frame, and an inner surface of the first cover member conforms generally to the shape of the inner concavity. This inner surface of the first cover member includes a highly reflective surface such as a metallized silver or other color surface defined from Mylar® polyester film or a like material. A second cover member is placed in covering relation with the inner surface of the first cover member so that the second cover member at least substantially covers the inner surface of the first cover member. Preferably, the second cover member is placed in complete covering relation with the inner surface of the first cover member. The second cover member is preferably defined from white or other color fabric or another suitable light-diffusive material that allows light to pass therethrough.

In a most preferred embodiment, the framework of the umbrella is defined by a central post, a plurality of circumferentially spaced apart, long arcuate outer ribs that project outwardly from an innermost end of the central post, and a plurality of circumferentially spaced struts that radiate out from a mid-span portion of the post and interconnect to a mid-span portion of the ribs, respectively. The struts are preferably slidably connected to the post to facilitate collapsing of the framework. In the most preferred embodiment, the first cover member is secured to and conforms generally with the outer ribs. The second cover member is placed in covering relation with the struts and a portion of the outer ribs so that only the second cover member is visible in the concavity, i.e., the struts are located between the second cover member and the first cover member.

In use, light from a source is incident on the second cover member in the concavity. Some of this light is reflected by the second cover member and exits the concavity, while some of the light passes through and is diffused by the second cover member. This diffused light is then incident on the inner, reflective surface of the first cover member and is, thus, reflected. A portion of the reflected light again passes through and is diffused by the second cover member and exits the mouth of the concavity.

One advantage of the present invention resides in the provision of a new and improved photographic umbrella with both reflective and diffusive linings.

Another advantage of the present invention is that it outputs greater light from the source than conventional photographic umbrellas so that a less intense source can be used and/or so that higher f-stops can be used by the photographer.

Still another advantage of the present invention resides in the provision of a photographic umbrella with reflective and diffusive linings wherein all light from an associated light source is reflected outwardly from the umbrella.

A further advantage of the present invention is that it provides increased light without introducing artifacts into the catch lights.

Still other benefits and advantages of the invention will become apparent to those of ordinary skill in the art to which the invention pertains upon reading and understanding the following specification.

BRIEF DESCRIPTION OF THE DRAWINGS

The invention may take form from various components and arrangements of components, preferred embodiments of which are illustrated in the accompanying drawings that form a part hereof and wherein.

DETAILED DESCRIPTION OF THE PRESENT INVENTION

Figure 1:
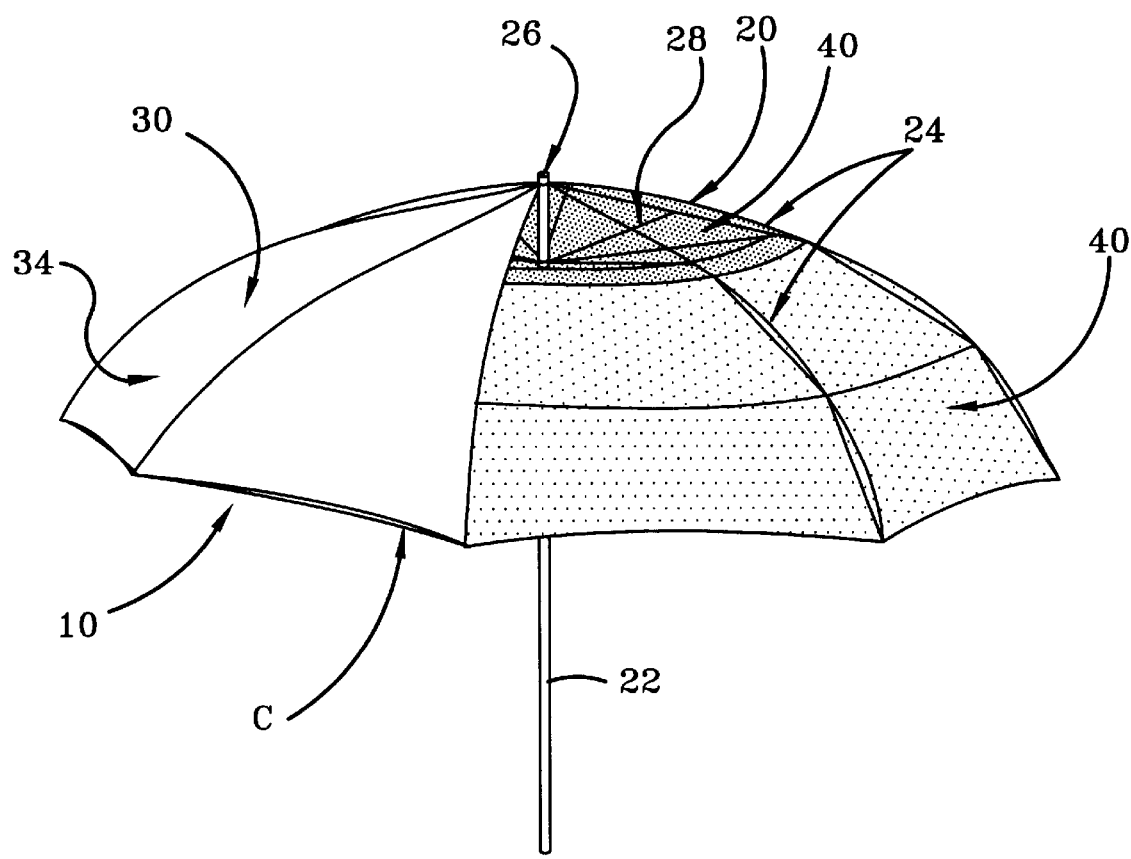
FIG. 1 is a perspective view of a photographic umbrella formed in accordance with the present invention and with the first cover member partially broken away to reveal the second cover member; and, FIG. 2 is cross-sectional view of the photographic umbrella of FIG. 1 and illustrates reflection and diffusion of light rays from a source.

Referring now to the drawings wherein the showings are for purposes of illustrating preferred embodiments of the invention only and not for purposes of limiting same, a photographic umbrella formed in accordance with the present invention is illustrated generally at 10. Except as otherwise illustrated and described, the umbrella is similar in all respects to the umbrella disclosed in U.S. Pat. No. 5,023,757.

Figure 2:
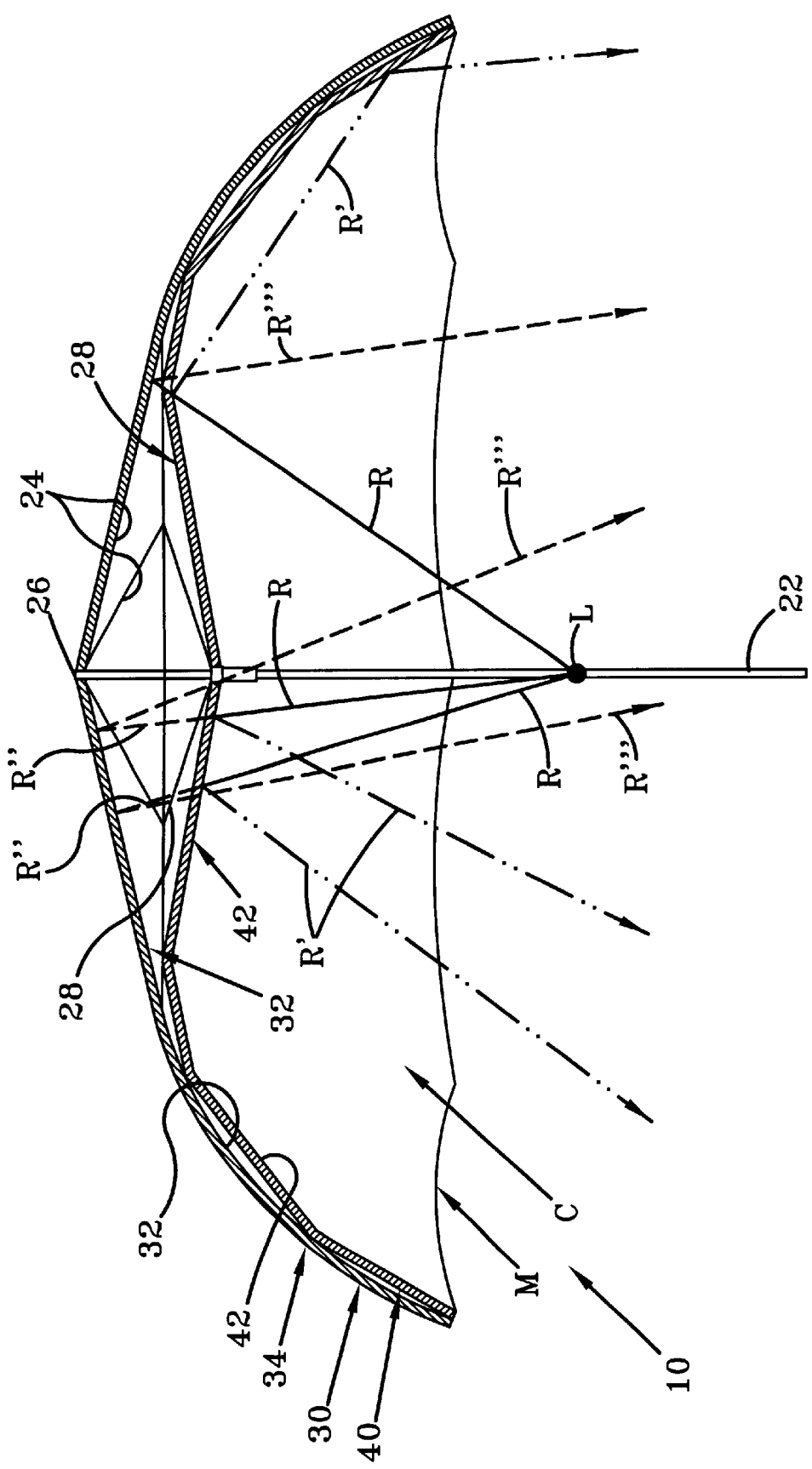

The umbrella 10 comprises a conventional skeletal framework 20 defined by a central post 22 to which a plurality of long outer ribs 24 are attached. The outer ribs 24 are all connected at one end to an innermost end 26 of the central post 22 in a circumferentially spaced-apart manner. The outer ribs 24 extend radially outwardly from the post end 26 in an arcuate manner so that a recess or concavity C (FIG. 2) is defined. A plurality of struts 28 respectively interconnect a mid-span portion of the ribs 24 to the central post 22. The framework is collapsible in a conventional manner by sliding adjustment of the location where the struts 28 connect to the central post 22. A conventional light source L (FIG. 2) is affixed to the post 22 or otherwise located to direct light rays R into the concavity C through an entrance or mouth M of same.

A first cover member 30, preferably defined from fabric, is secured to or lies adjacent the outer ribs 24 and includes or defines an inner reflective surface 32 that conforms to and further defines the concavity C defined by the outer ribs 24 of the umbrella frame. The inner reflective surface 32 is metallized silver-colored or the like as can be obtained from a Mylar® polyester film or foil coating or any other suitable reflective material. This inner reflective surface 32 can be tinted to have any desired color or colors such as gold, yellow, blue, pink or any other color. Also, the first cover member 30 can be secured to the outer ribs 24 so that the ribs 24 lie adjacent the inner reflective surface 32 or so that the ribs 24 lie adjacent an outer surface 34 (typically dark or black in color) of the first cover member 30.

A second cover member 40, typically also made from fabric, is secured in covering relation relative to the reflective inner surface 32 of the first cover member 30. The second cover member 40 is white or other light-colored fabric or the like that allows incident light to pass therethrough so that the passed light is diffused without being significantly blocked. This second cover member 40 can also be tinted to a desired color such as off-white, pink, rose, blue or any other color. It is to be noted that the reflective inner surface 32 of the first cover member 30 and the second cover member 40 are different in terms of their light reflection/diffusion properties. The inner surface 32 of the first cover member 30 is highly reflective only and does not allow light to pass therethrough for diffusion purposes. The second cover member 40, on the other hand, reflects some light but it is intended to allow substantial light passage therethrough in either direction so that it acts primarily as a light diffuser.

In one embodiment, the diffusive second cover member 40 is secured in a manner where it is co-extensive with and closely adjacent the entire inner reflective surface 32 of the first cover member 30. However, a preferred embodiment is illustrated wherein the second cover member 40 is arranged to be closely adjacent only a first, outer portion of first cover member (i.e., the portion of the first cover member 30 located between the struts 28 and the mouth M of the concavity C). In this preferred embodiment, the second cover member 40 is also placed in covering relation with the struts 28 to eliminate the above-noted catch light artifacts. In one embodiment, it is preferred that the portion of the second cover member 40 that covers the struts 28 be flat or planar so that the light reflected/diffused by this portion of the second cover member covers a wide area after exiting the mouth M of the umbrella cavity C.

In one example of use, light rays R from the light source L enter the concavity C through the mouth M and are incident on the second cover member 40. Some of this light R is reflected by the second cover member 40 (indicated at R ') and exits the concavity C to light a subject. Other light rays R from the source L pass through the second cover member 40 and are diffused (as indicated at R"). These diffused light rays R" are then incident on the inner, reflective surface 32 of the first cover member 30 and are, thus, reflected. A portion of the light reflected by the surface 32 again passes through and is diffused by the second cover member 40 and exits the mouth M of the concavity C (indicated at R''') to be directed at the subject.

The invention has been described with reference to preferred embodiments. Of course, modifications and alterations will occur to others upon a reading and understanding of the preceding specification. It is intended that the invention be construed as including all such modifications and alterations insofar as they are encompassed by the appended claims literally or as construed according to the doctrine of equivalents.

Having thus described the preferred embodiments, what is claimed is:

1. A photographic umbrella comprising:
    a frame including: (i) a central post; (ii) a plurality of arcuate outer ribs connected to an end of the central post and extending outwardly therefrom to define a concavity; and, (iii) a plurality of struts connected to mid-span portions of said ribs, respectively and secured to said central post;
    a first cover conformed to said arcuate outer ribs and said concavity, said first cover including a light reflective inner surface;
    a second cover secured to said frame in covering relation with said light reflective inner surface of said first cover, said second cover defined from a light diffusive translucent material.

2. The photographic umbrella as set forth in claim 1, wherein said plurality of struts are located between said first and second covers.

3. The photographic umbrella as set forth in claim 1, wherein said light reflective inner surface of said first cover is silver color and said second cover is white color.

4. The photographic umbrella as set forth in claim 1, wherein said light reflective inner surface is tinted to have a color other than silver.

5. The photographic umbrella as set forth in claim 1, wherein said second cover is tinted to have a color other than white.

6. The photographic umbrella as set forth in claim 4, wherein said second cover is tinted to have a color other than white.

7. An apparatus for simultaneously reflecting and diffusing light from an associated source, said apparatus comprising:
    a frame including a central post, a plurality of arcuate outer ribs, and a plurality of struts that urge said outer ribs away from said post;
    a first cover secured to said outer ribs and including a light reflective inner surface defining a recess; and,
    a second cover secured to said frame in at least partial covering relation with said light reflective inner surface, said second cover defined from a translucent material that allows passage of light therethrough with a diffusive effect.

8. The apparatus as set forth in claim 7, wherein said plurality of struts are located between said first and second covers.

9. The apparatus as set forth in claim 8, wherein said second cover completely overlies said light reflective inner surface.

10. The apparatus as set forth in claim 7, wherein said light reflective inner surface of said first cover is silver and said second cover is white fabric.

11. The apparatus as set forth in claim 7, wherein said light reflective inner surface is tinted to have a color other than silver.

12. The apparatus as set forth in claim 7, wherein said second cover is tinted to have a color other than white.

13. The apparatus as set forth in claim 11, wherein said second cover is tinted to have a color other than white.

* * * * *